(12) United States Patent
Bhosale et al.

(10) Patent No.: US 10,897,842 B2
(45) Date of Patent: Jan. 26, 2021

(54) LIFT LINK ASSEMBLY OF A THREE-POINT HITCH

(71) Applicant: DEERE & COMPANY, Moline, IL (US)

(72) Inventors: Digvijay Bhosale, Pune (IN); Benjamin J. Heimbuch, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 251 days.

(21) Appl. No.: 15/940,171

(22) Filed: Mar. 29, 2018

(65) Prior Publication Data
US 2019/0297770 A1    Oct. 3, 2019

(51) Int. Cl.
*A01B 59/00* (2006.01)

(52) U.S. Cl.
CPC .................. *A01B 59/004* (2013.01)

(58) Field of Classification Search
CPC ..... A01B 59/004; A01B 59/00; A01B 59/002; A01B 59/066
See application file for complete search history.

(56) References Cited

U.S. PATENT DOCUMENTS

| 4,034,999 A | 7/1977 | Jackson |
| 4,194,757 A * | 3/1980 | Lucas .................. A01B 59/004 172/439 |
| 4,418,935 A | 12/1983 | O'Connor |
| 6,056,069 A * | 5/2000 | Hagen .................. A01B 59/004 172/679 |
| 6,148,927 A | 11/2000 | Hoffart |
| 7,658,569 B2 | 2/2010 | De Oliveira |
| 7,938,206 B2 | 5/2011 | Buhrke et al. |
| 9,491,898 B2 | 11/2016 | Laubner et al. |
| 9,788,471 B2 | 10/2017 | Buttjer |
| 10,143,124 B2 * | 12/2018 | Shaw .................. A01B 59/004 |
| 2013/0037283 A1 | 2/2013 | Laubner et al. |

FOREIGN PATENT DOCUMENTS

| DE | 1238706 B | 4/1967 |
| DE | 3334472 A1 | 4/1985 |
| EP | 2540149 A1 | 1/2013 |
| GB | 2460657 A | 12/2009 |

OTHER PUBLICATIONS

Benjamin J. Heimbuch, Photos taken at Agritechnica Farm Show at the GKN-Walterscheid booth, 2011 (3 page).
Benjamin J. Heimbuch, Portion of a John Deere Three-Point Hitch Assembly, available to the public before Dec. 9, 2016 (1 page).
German Search Report issued in counterpart application No. 102019202595.1 dated Nov. 7, 2019.

* cited by examiner

*Primary Examiner* — Ruth Ilan
*Assistant Examiner* — Harold Eric Pahlck, III

(57) ABSTRACT

A lift link assembly of a three-point hitch. The lift link assembly includes a pin, a yoke, and a shaft. The yoke includes a main housing and first and second side arms that extend downwardly therefrom. The shaft includes a shank and a head positioned on a lower-end thereof. The shank is positioned in an upper-end through hole of the main housing, and the head includes an attachment point that receives the pin when the lift link assembly is in certain modes.

19 Claims, 7 Drawing Sheets

LIFT LINK ASSEMBLY OF A THREE-POINT HITCH

FIELD OF THE DISCLOSURE

The present disclosure relates to a lift link assembly of a three-point hitch. The lift link assembly is configured to be adjustable between a retracted mode, a floating mode, and an extended mode.

BACKGROUND OF THE DISCLOSURE

Agricultural and industrial work machines may include a three-point hitch for attaching an implement to the work machine. The three-point hitch and, thus, the implement may be raised and lowered.

When transporting the work machine and implement, the three-point hitch may be raised to a top position by a pair of lift cylinders, and a lift link may be shortened to its shortest length. This raises the three-point hitch and implement, so that there is a clearance between the implement and the ground.

Similarly, when the work machine is pulling a secondary implement attached to a drawbar, the three-point hitch may be raised to the top position by the pair of lift cylinders, and the lift link may be shortened to it shortest length. In combination, this raises the three-point hitch and implement, so that there is clearance between the implement (e.g., plow) and the secondary implement (e.g., wagon).

In known three-point hitches, shortening the lift link requires rotating a manually operated rotatable length adjuster. Turning the rotatable length adjuster may be time consuming and difficult. Further, the length of the lift link is typically set to an ideal length for using a given implement. Thus, when the lift link is shortened with the adjuster to transport the implement, for example, it may be difficult to determine how many times to counter rotate the adjuster to return the lift link to its ideal length for using the implement.

SUMMARY OF THE DISCLOSURE

Disclosed is a lift link assembly of a three-point hitch. The lift link assembly includes a pin, a yoke, and a shaft. The yoke includes a main housing, a first side arm, and a second side arm. The shaft includes a shank and a head positioned on a lower-end thereof. The shank is positioned in an upper-end through hole of the main housing, and the head includes an attachment point that receives the pin. The lift link assembly is configured to be adjustable between a retracted mode, a floating mode, and an extended mode. The retracted mode may be used for storage and or transport of an implement, while the floating and extended modes may be used for work operations associated with the implement.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
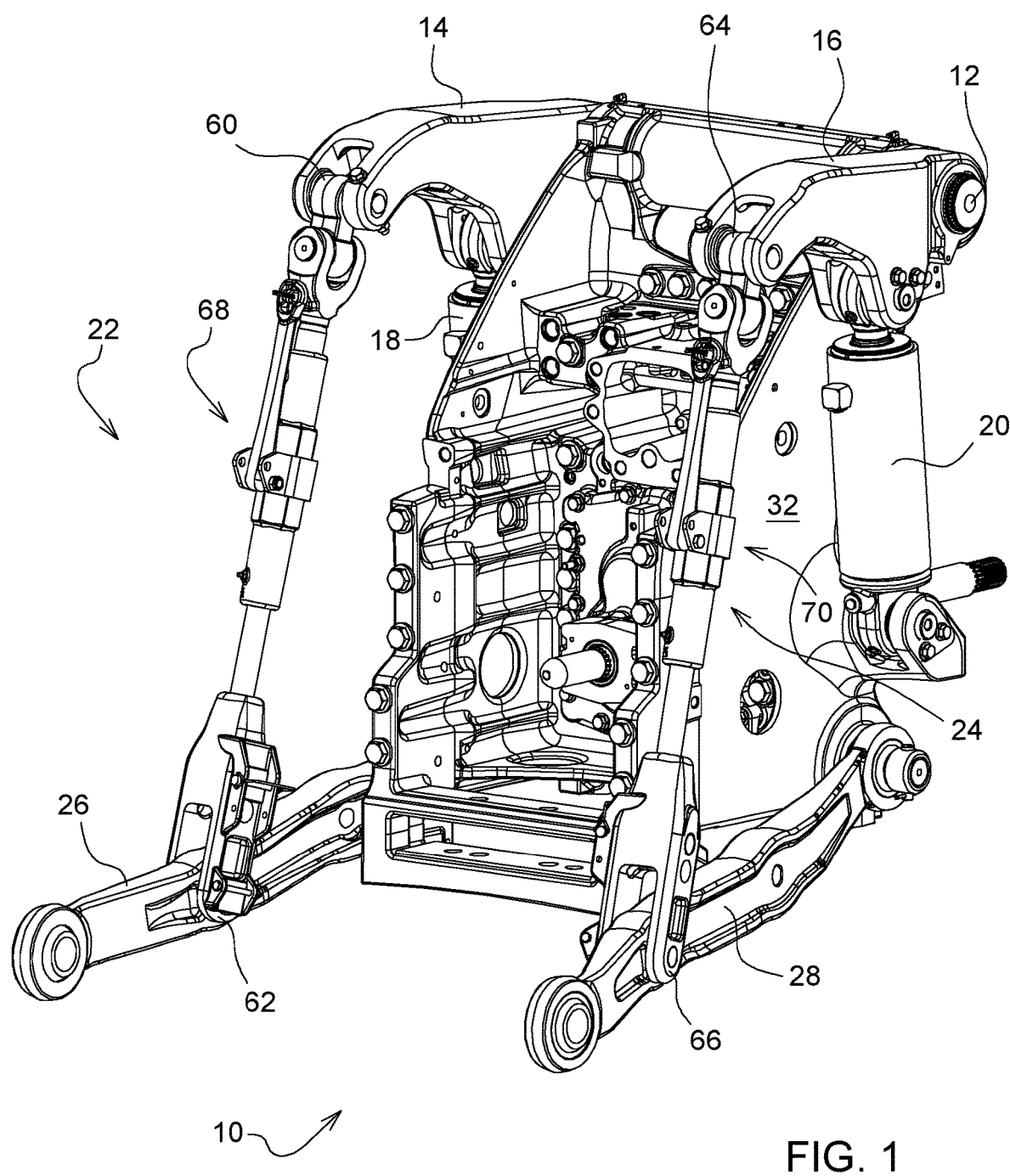
FIG. 1. is a perspective view of a three-point hitch.

Referring to FIG. 1, there is shown a perspective view of a three-point hitch 10. The three-point hitch 10 may be part of a work machine, such as an agricultural tractor or an industrial work machine, and it may be used to mount implements to the work machine. The three-point hitch 10 may include a rocker shaft 12, a left rocker arm 14, a right rocker arm 16, a left lift cylinder 18, a right lift cylinder 20, a left lift link assembly 22, a right lift link assembly 24, a left draft link 26, a right draft link 28, and an upper link (not shown so as to highlight the other components of the three-point hitch 10).

An end of the left rocker arm 14 may be coupled to an end of the rocker shaft 12, and an end of the right rocker arm 16 may be coupled to an opposite end the rocker shaft 12.

A first end 60 of the left lift link assembly 22 may be rotatably coupled to an opposite end of the left rocker arm 14, and a second end 62 of the left lift link assembly 22 may be rotatably coupled to the left draft link 26. A first end 64 of the right lift link assembly 24 may be rotatably coupled to an opposite end of the right rocker arm 16, and a second end 66 of the right lift link assembly 24 may be rotatably coupled to the right draft link 28. The left lift link assembly 22 may include a left rotatable length adjuster 68, and likewise the right lift link assembly 24 may include a right rotatable length adjuster 70.

An end of the left lift cylinder 18 may be rotatably coupled to a housing 32 of the work machine, and an opposite end of the left lift cylinder 18 may be coupled to the left rocker arm 14. An end of the right lift cylinder 20 may be rotatably coupled to the housing 32, and an opposite end of the right lift cylinder 20 may be coupled to the right rocker arm 16.

The upper link (not shown) is positioned laterally between the lift link assemblies 22, 24 and is rotatably coupled to the housing 32 of the work machine.

The implement is mounted to the left draft link 26, the right draft link 28, and the upper link. When the lift cylinders 18, 20 extend outwards, the rocker arms 14, 16, the lift link assemblies 22, 24, the draft links 26, 28, and the implement (if mounted) rotate upwards. In contrast, when the lift cylinders 18, 20 retract inwards, the rocker arms 14, 16, the lift link assemblies 22, 24, the draft links 26, 28, and the implement (if mounted) rotate downwards.

In some embodiments of the three-point hitch 10, such as in the embodiment shown in FIG. 1, the lift link assemblies 22, 24 may be identical to one another. Thus, moving forward in the description, only the left lift link assembly 22 will be described in detail, as such a description is adequate to also describe the right lift link assembly 24.

Figure 2:
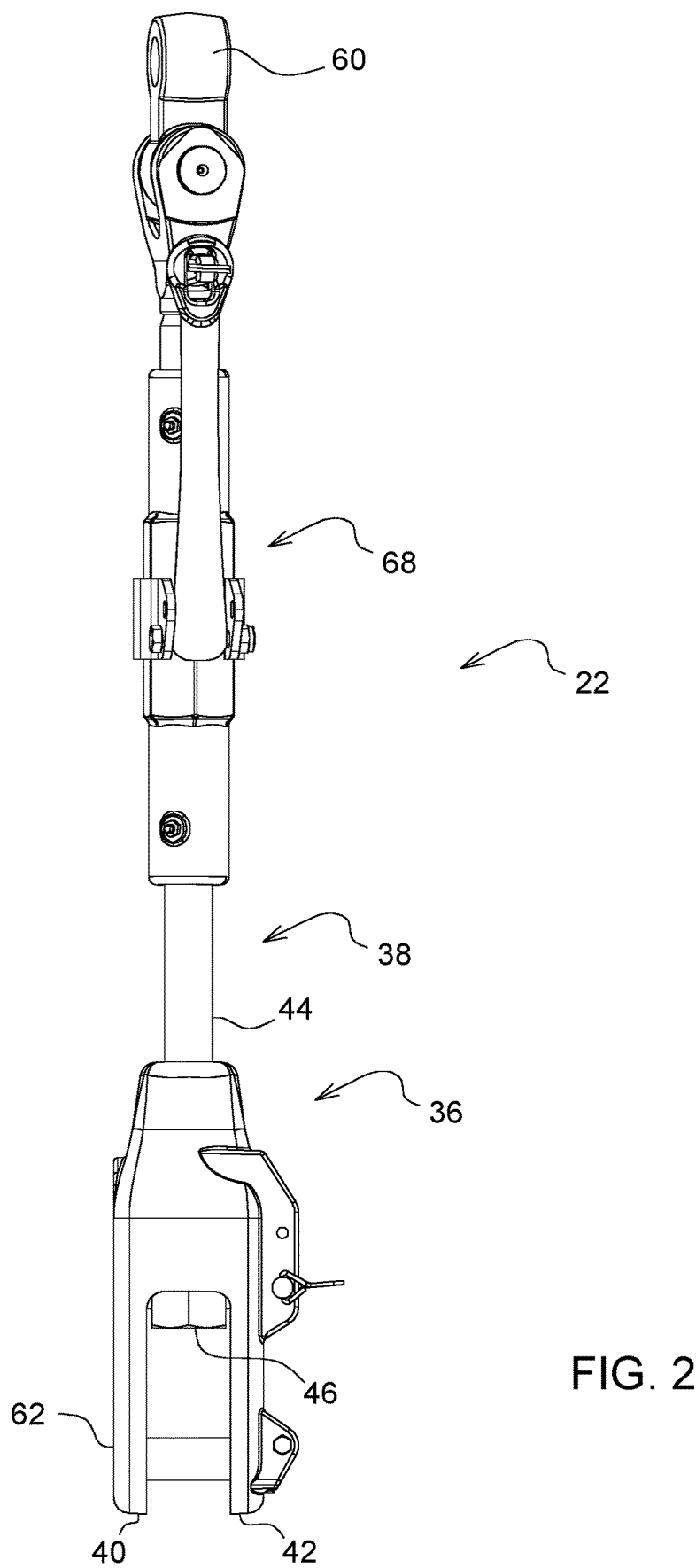
FIG. 2 is a front elevational view of a lift link assembly.
Figure 3:
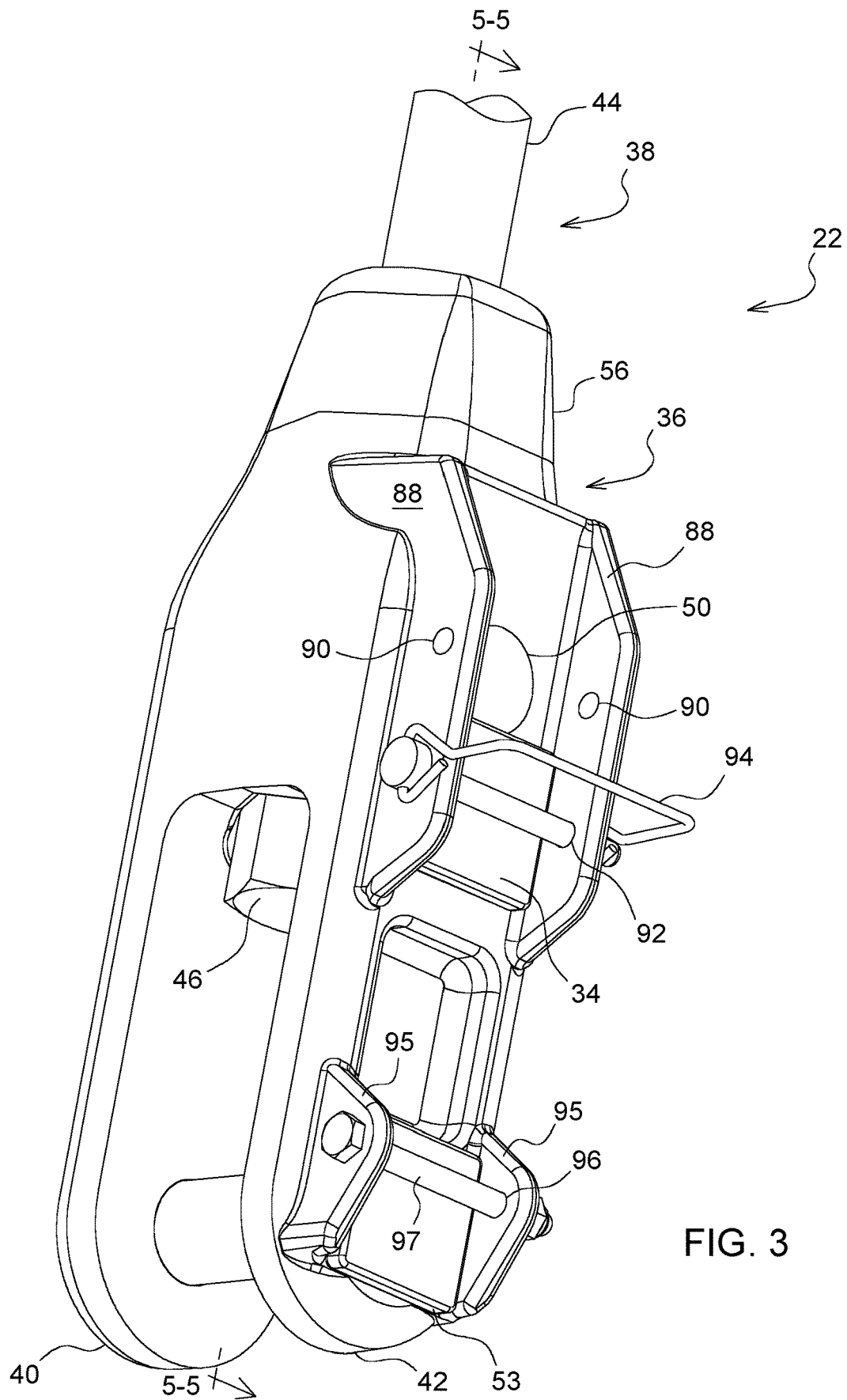
FIG. 3 is an enlarged perspective view of a portion of the lift link assembly.
Figure 4:
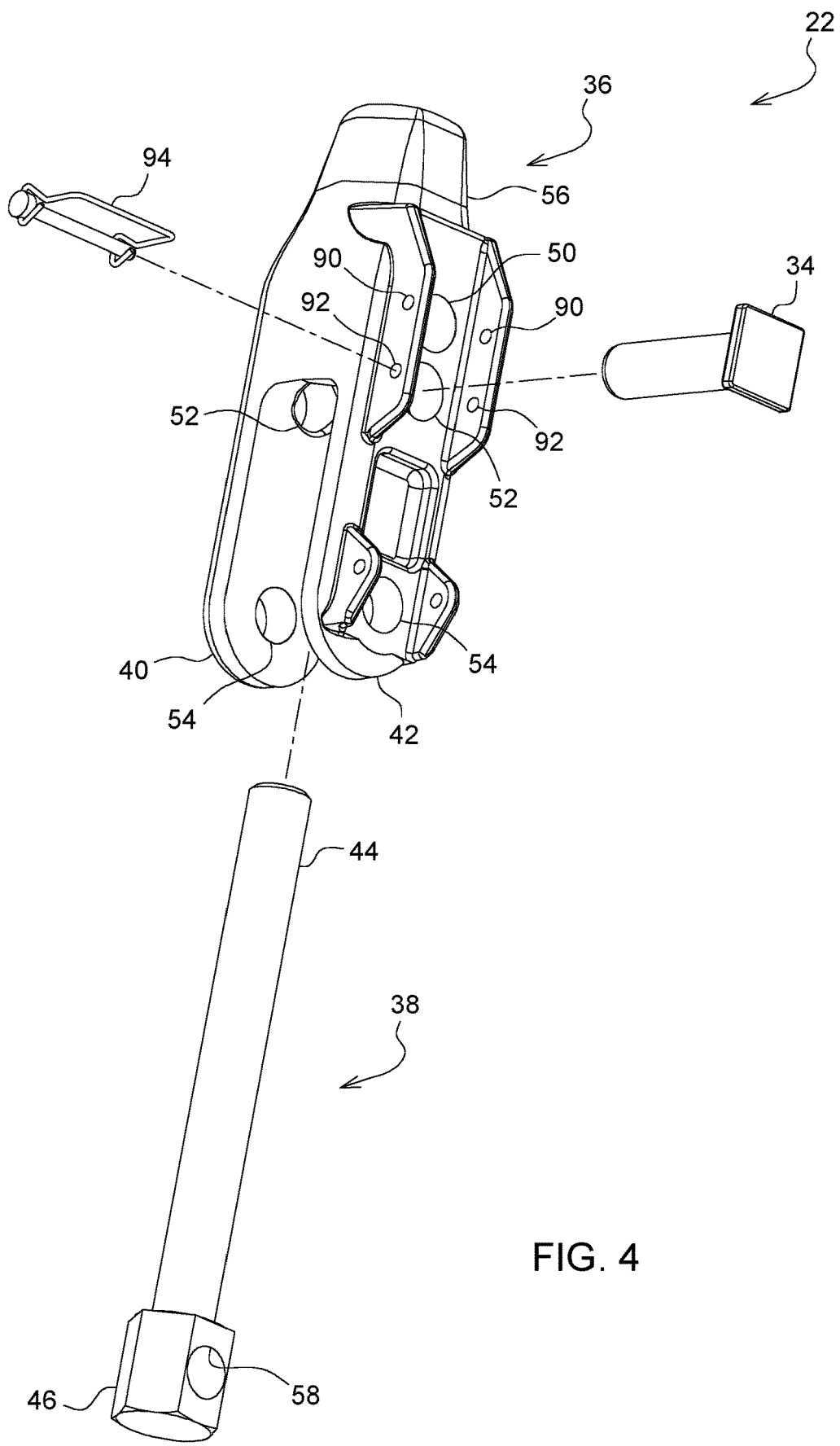
FIG. 4 is an exploded perspective view of the portion of the lift link assembly.

Referring to FIGS. 2-4, the lift link assembly 22 includes a pin 34, a yoke 36, and a shaft 38. The yoke 36 includes a main housing 56, a first side arm 40, and a second side arm 42. The main housing 56 includes an upper-end through hole 48, and the first and second side arms 40, 42 extend downwardly from the main housing 56. The shaft 38 includes a shank 44 and a head 46 positioned on a lower-end thereof. The shank 44 is positioned in the upper-end through hole 48. The head 46 includes an attachment point 58 that receives the pin 34 in certain modes. As illustrated, the attachment point 58 may be a through hole that is oriented perpendicularly relative to the upper-end through hole 48.

At least one of the side arms 40, 42 may include an upper-mid through hole 50, a lower-mid through hole 52 positioned under the upper-mid through hole 50, and a lower through hole 54 positioned under the lower-mid through hole 52. In the illustrated embodiment, both of the side arms 40, 42 include an upper-mid through hole 50, a lower-mid through hole 52, and a lower through hole 54.

Figure 5:
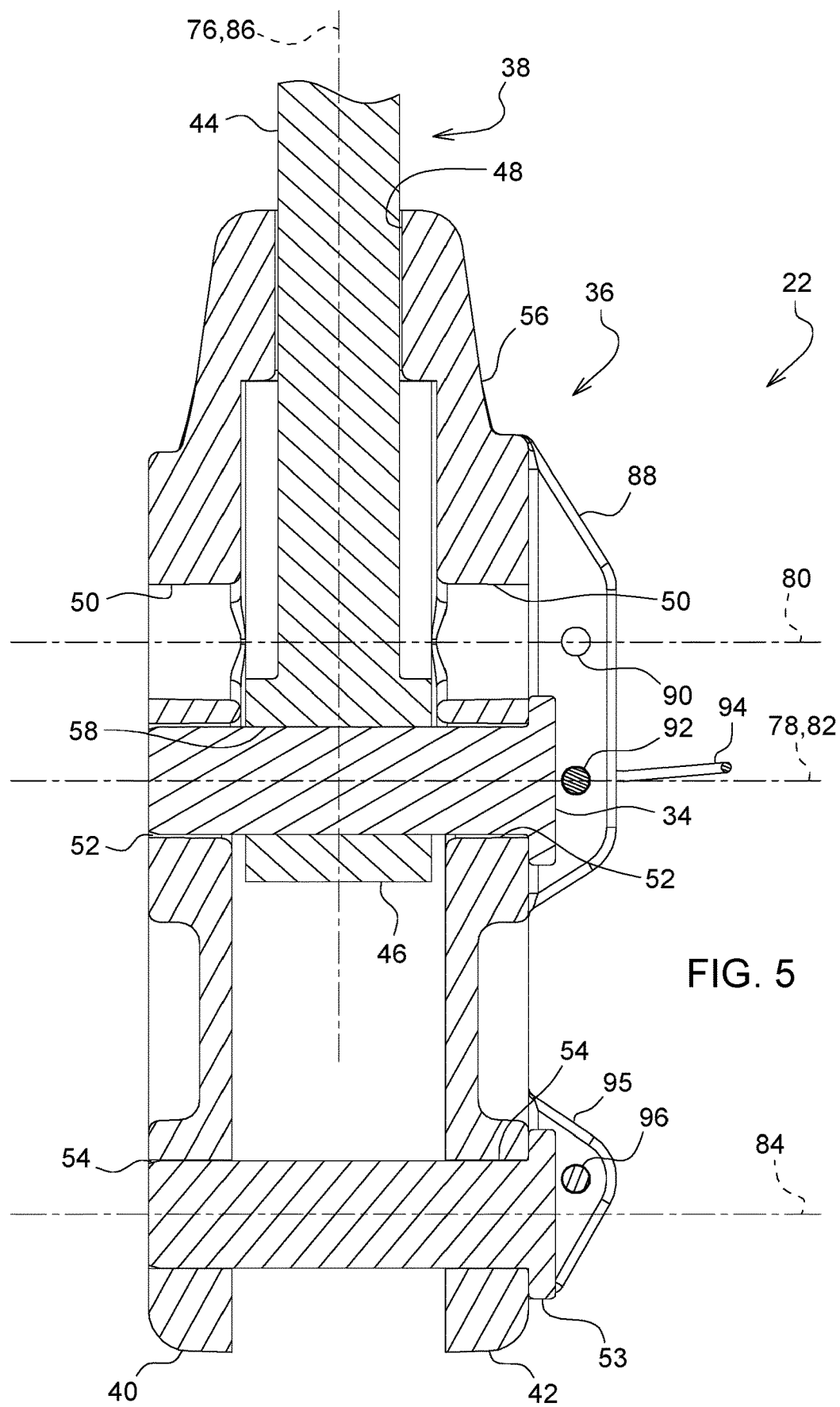
FIG. 5 is a sectional view of FIG. 3 taken along lines 5-5, showing the lift link assembly in a retracted mode.

An axis 76 defined by the upper-end though hole 48 may be oriented perpendicularly relative to the an axis 78 defined by the attachment point 58, an axis 80 defined by the upper-mid through hole 50, an axis 82 defined by the lower-mid through hole 52, and an axis 84 defined by the lower through hole 54 (see FIG. 5). The attachment point 58 may be configured to align with the upper-mid through hole 50 and the lower-mid through hole 52, but not configured to align with the lower through hole 54. The axis 76 defined by the upper-end through hole 48 may be aligned with an axis 86 defined by the shaft 38.

The pin 34 may be retained into position via a retaining pin 94. The retaining pin 94 may be, for example, a bolt, a cotter pin, or any other kind of member that may be inserted into one or more through holes and held in place. The retaining pin 94 may be positioned in either an upper pair of retaining pin through holes 90 or a lower pair of retaining pin through holes 92, depending on where the pin 34 is positioned. For example, if the pin 34 is in an upper position, then the retaining pin 94 may be in the upper pair of retaining pin through holes 90 and vice-versa. The upper and lower retaining pin through holes 90, 92 may be defined by a pair of plates 88 that extend laterally outwards from the yoke 36. The pair of plates 88 may be vertically oriented, and aligned and spaced apart from one another in a generally fore-and-aft direction.

A pin 53 may be positioned in the lower through holes 54, so as to couple the lift link assembly 22 to the lift link assembly 22. The pin 53 may be retained into position via a retaining pin 97. The retaining pin 97 may be, for example, a bolt, a cotter pin, or any other kind of member that may be inserted into one or more through holes and held into place. The retaining pin 97 may be positioned in a pair of retaining pin through holes 96 that are defined by a pair of plates 95 that extend laterally outwards from the yoke 36. The pair of plates 95 may be vertically oriented, and aligned and spaced apart from one another in a generally fore-and-aft direction.

The positioning of the pin 34 relative to the attachment point 58 may partially define the distance between the first end 60 and the second end 62 of the lift link assembly 22. The operator may adjust the positioning of the pin 34 relative to the yoke 36, so as to retract and extend the lift link assembly 22 (and thus adjust how high and low the three-point hitch 10 and the implement may be able to travel). Further, the positioning of the adjuster 68 relative to the shaft 38 may also partially define the distance between the first end 60 and the second end 62. For example, the operator may turn the adjuster 68, which may be engaged with a threaded portion of the shaft 38, so as to retract and extend the lift link assembly 22 (and thus adjust how high and low the three-point hitch 10 and the implement may be able to travel).

Referring to FIG. 5, there is shown a sectional view of FIG. 3 taken along lines 5-5, showing the lift link assembly 22 in the retracted mode. In the retracted mode, the pin 34 may be positioned in the attachment point 58 and in the lower-mid through hole 52. Thus, in the retracted mode, the attachment point 58 may be substantially fixed relative to the pin 34 and substantially fixed relative to the yoke 36.

Figure 6:
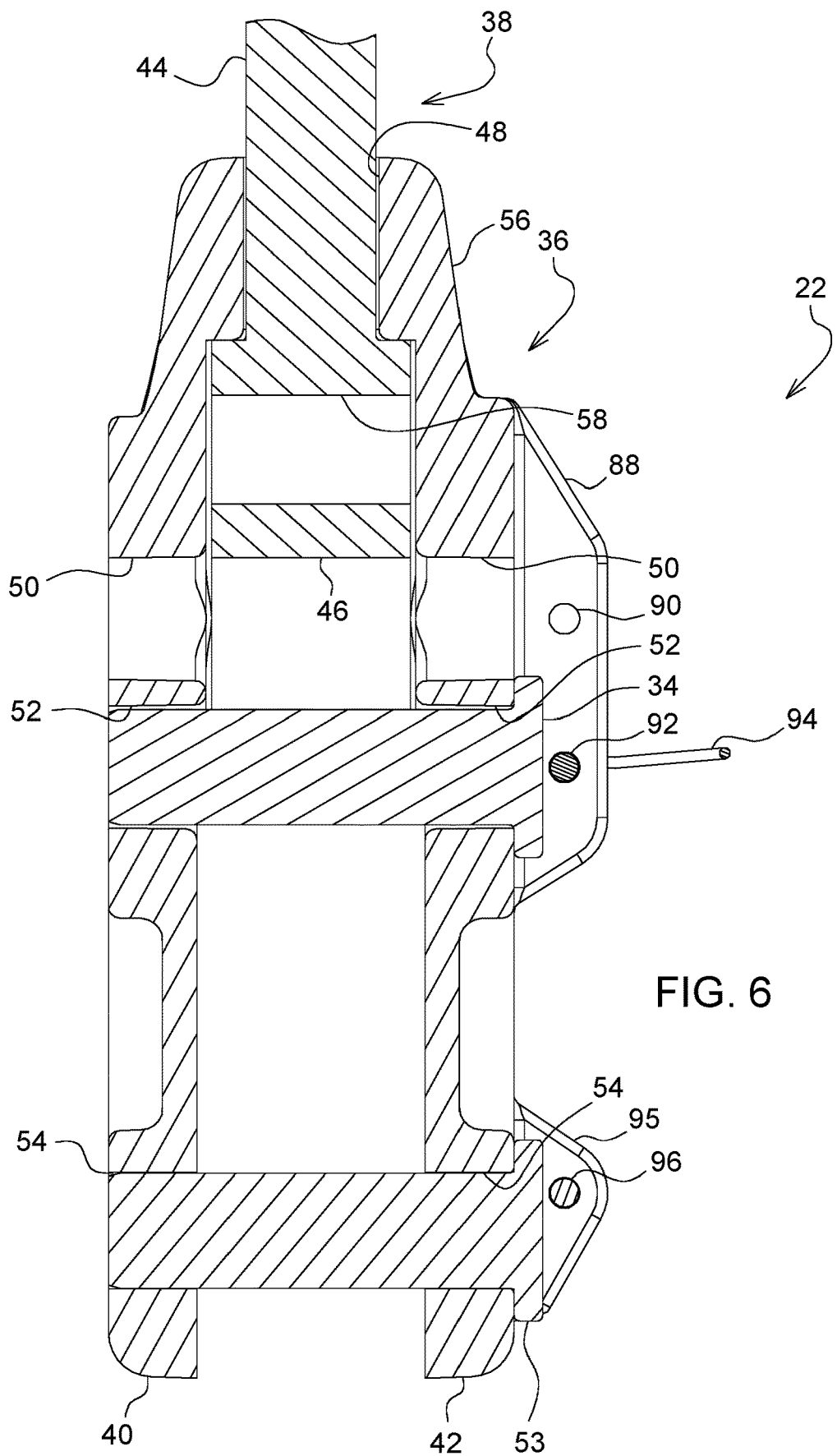
FIG. 6 is similar to FIG. 5, but showing the lift link assembly in a floating mode.

Referring to FIG. 6, the lift link assembly 22 is shown in the floating mode. In the floating mode, the pin 34 may be positioned in the lower-mid through hole 52, and the attachment point 58 may be positioned above the pin 34. In the floating mode, the attachment point 58 is free to slide back-and-forth relative to the pin 34 and relative to the yoke 36. As illustrated, the attachment point 58 may be free to slide back-and-forth between a first position and a second position. The first position may be defined by a top point of contact between a top of the head 46 and an inner bottom of the main housing 56. When the attachment point 58 is in the first position, it may be capped by the main housing 56. The second position may be defined by a bottom point of contact between a bottom of the head 46 and the pin 34. When the attachment point 58 is in the second position, the attachment point 58 may be aligned with the upper-mid through hole 50.

When the lift link assembly 22 is in the floating mode, the pin 34 may be positioned below the attachment point 58, and in the lower-mid through holes 52 of the side arms 40, 42. In the floating mode, portions of the three-point hitch 10 and the entire implement are free to float slightly up-and-down. The floating mode may be necessary for using certain implements and/or for operating in certain conditions.

Figure 7:
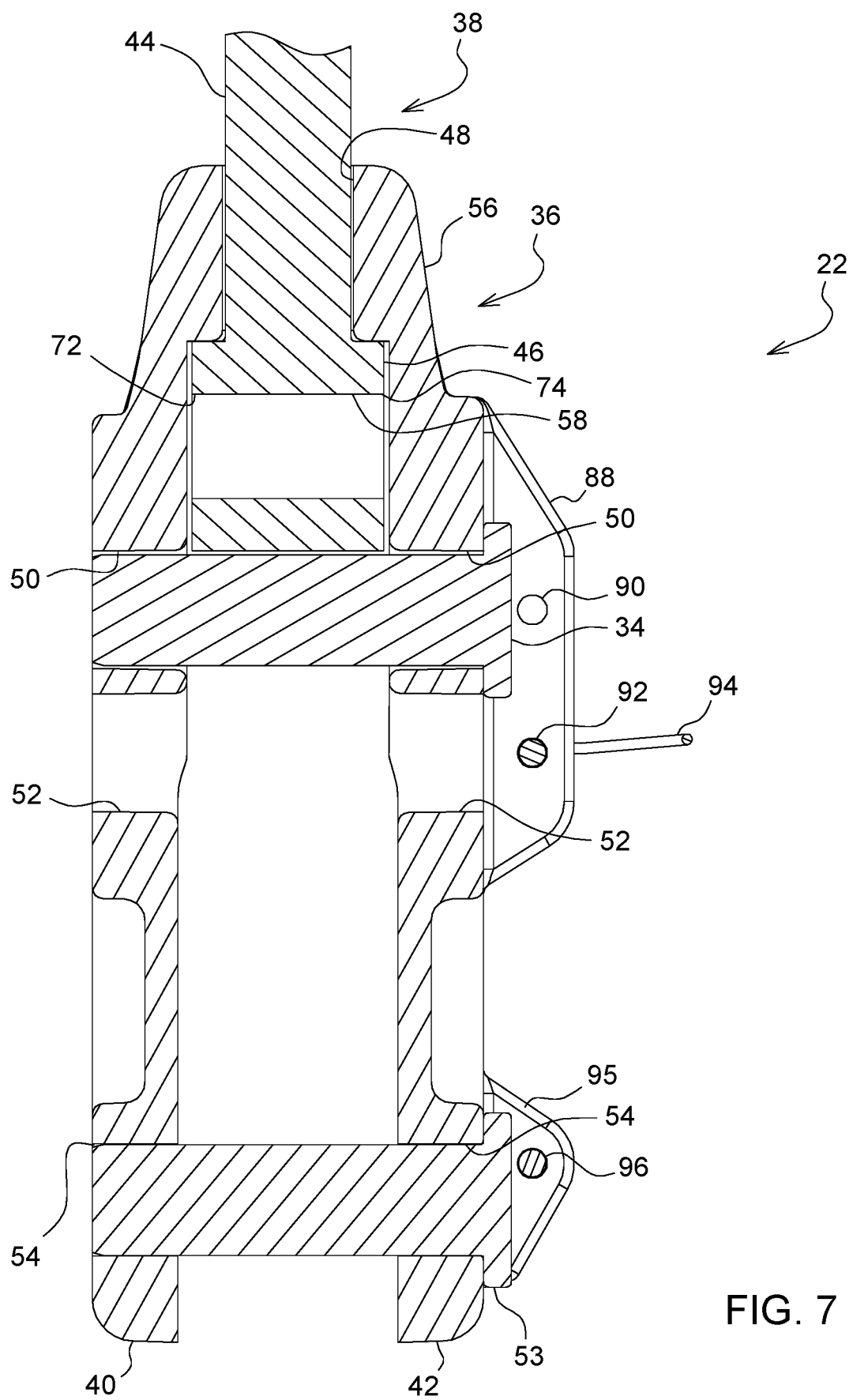
FIG. 7 is similar to FIG. 5, but showing the lift link assembly in an extended mode.

Referring to FIG. 7, the lift link assembly 22 is shown in the extended mode. In other respects, FIG. 7 is similar to FIG. 6.

In the extended mode, the attachment point 58 may be positioned above the pin 34, and the pin 34 may be positioned in the upper-mid through hole 50. The attachment point 58 includes a first end opening 72 and a second end opening 74 positioned opposite thereof. As illustrated, in the extended mode, the first and second end openings 72, 74 may be capped by the main housing 56.

Further, when the lift link assembly 22 is in an extended mode, the head 46 may be in contact with the pin 34 and in contact with the main housing 56, such that the attachment point 58 is substantially fixed relative to the pin 34 and substantially fixed relative to the yoke 36.

Still further, when the lift link assembly 22 is in the extended mode, the pin 34 may be positioned below the attachment point 58 and in upper-mid through holes 50 of the side arms 40, 42. In the extended mode, portions of the three-point hitch 10 and the entire implement may be lowered to a lower operating position (than would be possible in a three-point hitch 10 that lowers via only lift cylinders 18, 20 and the adjusters 68, 70). The lower operating position may be necessary for using certain implements.

As shown in the contrast between FIGS. 5 and 7, the attachment point 58 is farther away from the lower through hole 54 when the lift link assembly 22 is in the extended mode than when the lift link assembly 22 is in the retracted mode.

When the lift link assembly 22 is in the retracted mode, the pin 34 may be positioned in the attachment point 58 and in lower-mid through holes 52 of the side arms 40, 42. In the retracted mode, portions of the three-point hitch 10 and the entire implement may be raised to a higher operating position (than would be possible in an otherwise identical three-point hitch that raises via only the lift cylinders 18 and the adjuster 68). The higher operating position may be necessary for there to be (1) clearance between an implement that is mounted to the three-point hitch 10 and the ground and/or (2) clearance between the implement (e.g., plow) and a secondary implement (e.g., wagon) that is being pulled by a drawbar of a work machine.

Use of the pin 34 and its attachment point 58 may increase the overall flexibility and distance between the very lowest and highest operating positions of the three-point hitch 10, in contrast to an otherwise identical three-point hitch that includes only lift cylinders 18 and the adjuster 68.

Further, use of the pin 34 and the attachment point 58 may negate the need for making as many changes via the adjuster 68. For example, the operator may switch between using and transporting the implement by adjusting only the location of the pin 34 relative to the attachment point 58.

Still further, use of the pin 34 and the attachment point 58 may provide for easily repeatable adjustments of the three-point hitch 10. In contrast, using the adjuster 68 may not be easily repeatable, as most operators do not remember how many times to rotate or counter rotate the adjuster 68 to get back to a previous, and desirable, position thereof.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A lift link assembly of a three-point hitch, the lift link assembly comprising:
    a pin;
    a yoke comprising a main housing and first and second side arms that extend downwardly therefrom, the main housing comprising an upper-end through hole; and
    a shaft comprising a shank and a head positioned on a lower-end thereof, the shank being positioned in the upper-end through hole, the head comprising an attachment point that receives the pin when the lift link assembly is in a retracted mode;
    wherein at least one of the first and second side arms comprise an upper-mid through hole, a lower-mid through hole positioned under the upper-mid through hole, and a lower through hole positioned under the lower-mid through hole, and the attachment point is configured to align only with the upper-mid through hole and the lower-mid through hole.

2. The lift link assembly of claim 1, wherein the attachment point is a through hole.

3. The lift link assembly of claim 1, wherein the attachment point is a hole that is oriented perpendicularly relative to the upper-end through hole.

4. The lift link assembly of claim 1, wherein a first end of the lift link assembly is configured to be rotatably coupled to a rocker arm, a second end of the lift link assembly is configured to be rotatably coupled to a draft link, and a position of the pin relative to the attachment point defines a distance between the first end and the second end.

5. The lift link assembly of claim 1, wherein when the lift link assembly is in the retracted mode, the attachment point is substantially fixed relative to the pin and substantially fixed relative to the yoke.

6. The lift link assembly of claim 1, wherein when the lift link assembly is in an extended mode, the head is in contact with the pin, such that the attachment point is substantially fixed relative to the pin and substantially fixed relative to the yoke.

7. The lift link assembly of claim 1, wherein the attachment point comprises a first end opening and a second end opening positioned opposite thereof, and when the lift link assembly is in an extended mode, the first and second end openings are capped by the main housing.

8. A lift link assembly of a three-point hitch, the lift link assembly comprising:
    a pin;
    a yoke comprising a main housing and first and second side arms that extend downwardly therefrom, the main housing comprising an upper-end through hole; and
    a shaft comprising a shank and a head positioned on a lower-end thereof, the shank being positioned in the upper-end through hole, the head comprising an attachment point that receives the pin when the lift link assembly is in a retracted mode;
    wherein when the lift link assembly is in a floating mode, the attachment point is free to slide back-and-forth relative to the pin and relative to the yoke.

9. The lift link assembly of claim 8, wherein at least one of the first and second side arms comprises an upper-mid through hole, a lower-mid through hole positioned under the upper-mid through hole, and a lower through hole positioned under the lower-mid through hole, and when the lift link assembly is in the floating mode, the attachment point is free to slide back-and-forth between a first position in which the attachment point is capped by the main housing and a second position in which the attachment point is aligned with the upper-mid through hole.

10. The lift link assembly of claim 8, wherein when the lift link assembly is in the floating mode, the attachment point is positioned above the pin.

11. The lift link assembly of claim 8, wherein at least one of the first and second side arms comprises an upper-mid through hole, a lower-mid through hole positioned under the upper-mid through hole, and a lower through hole positioned under the lower-mid through hole, and when the lift link assembly is in the floating mode, the pin is positioned in the lower-mid through hole, and the attachment point is positioned above the pin.

12. The lift link assembly of claim 8, wherein when the lift link assembly is in the floating mode, the attachment point is free to slide back and forth between a first position which is defined by a top point of contact between a top of the head and an inner bottom of the main housing, and a second position which is defined by a bottom point of contact between a bottom of the head and the pin.

13. A lift link assembly of a three-point hitch, the lift link assembly comprising:
    a pin;
    a yoke comprising a main housing and first and second side arms that extend downwardly therefrom, the main housing comprising an upper-end through hole; and
    a shaft comprising a shank and a head positioned on a lower-end thereof, the shank being positioned in the upper-end through hole, the head comprising an attachment point that receives the pin when the lift link assembly is in a retracted mode;
    wherein at least one of the first and second side arms comprises an upper-mid through hole, a lower-mid through hole positioned under the upper-mid through hole, and a lower through hole positioned under the lower-mid through hole, and when the lift link assembly is in an extended mode;

the attachment point is positioned above the pin; and the pin is positioned in the upper-mid through hole.

14. The lift link assembly of claim 13, wherein when the lift link assembly is in the retracted mode, the pin is positioned in the attachment point and in the lower-mid through hole.

15. The lift link assembly of claim 14, wherein the attachment point is farther away from the lower through hole when the lift link assembly is in the extended mode than when the lift link assembly is in the retracted mode.

16. A lift link assembly of a three-point hitch, the lift link assembly comprising:

a pin;

a yoke comprising a main housing and first and second side arms that extend downwardly therefrom, the main housing comprising an upper-end through hole; and a shaft comprising a shank and a head positioned on a lower-end thereof, the shank being positioned in the upper-end through hole, the head comprising an attachment point that receives the pin when the lift link assembly is in a retracted mode;

wherein when the lift link assembly is in an extended mode, the attachment point is positioned above the pin.

17. The lift link assembly of claim 16, wherein when the lift link assembly is in the extended mode, the attachment point is substantially fixed relative to the pin and substantially fixed relative to the yoke.

18. A lift link assembly of a three-point hitch, the lift link assembly comprising:

a pin;

a yoke comprising a main housing and first and second side arms that extend downwardly therefrom, the main housing comprising an upper-end through hole; and a shaft comprising a shank and a head positioned on a lower-end thereof, the shank being positioned in the upper-end through hole, the head comprising an attachment point that receives the pin when the lift link assembly is in a retracted mode;

wherein at least one of the first and second side arms comprises an upper-mid through hole, a lower-mid through hole positioned under the upper-mid through hole, and a lower through hole positioned under the lower-mid through hole, and when the lift link assembly is in the retracted mode;

the pin is positioned in the lower-mid through hole; and the pin is positioned in the attachment point.

19. The lift link assembly of claim 18, wherein an axis defined by the upper-end through hole is oriented perpendicularly relative to:

an axis defined by the attachment point;

an axis defined by the upper-mid through hole;

an axis defined by the lower-mid through hole; and an axis defined by the lower through hole.

* * * * *